(12) United States Patent
Munguia

(10) Patent No.: US 7,281,148 B2
(45) Date of Patent: Oct. 9, 2007

(54) POWER MANAGED BUSSES AND ARBITRATION

(75) Inventor: Peter R. Munguia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 10/809,970

(22) Filed: Mar. 26, 2004

(65) Prior Publication Data

US 2005/0216607 A1    Sep. 29, 2005

(51) Int. Cl.
G06F 13/18    (2006.01)
(52) U.S. Cl. ........................ 713/322; 710/309
(58) Field of Classification Search ............... 713/501, 713/503, 600; 710/107, 305, 307
See application file for complete search history.

(56) References Cited

U.S. PATENT DOCUMENTS

| | | | |
|---|---|---|---|
| 5,237,676 A | 8/1993 | Arimilli et al. | |
| 5,509,126 A | 4/1996 | Oprescu et al. | |
| 5,559,967 A * | 9/1996 | Oprescu et al. | 710/105 |
| 5,581,729 A | 12/1996 | Nishtala et al. | |
| 5,627,744 A | 5/1997 | Baker et al. | |
| 5,628,019 A | 5/1997 | O'Brien | |
| 5,630,163 A * | 5/1997 | Fung et al. | 710/307 |
| 5,666,422 A | 9/1997 | Harrison et al. | |
| 5,825,854 A | 10/1998 | Larson et al. | |
| 5,949,891 A | 9/1999 | Wagner et al. | |
| 6,006,303 A | 12/1999 | Barnaby et al. | |
| 6,073,244 A | 6/2000 | Iwazaki | |
| 6,079,022 A | 6/2000 | Young | |
| 6,134,621 A * | 10/2000 | Kelley et al. | 710/311 |
| 6,185,692 B1 * | 2/2001 | Wolford | 713/501 |
| 6,304,645 B1 | 10/2001 | Holland et al. | |
| 6,404,883 B1 | 6/2002 | Hartmeier | |
| 6,418,201 B1 | 7/2002 | Holland et al. | |
| 6,484,222 B1 | 11/2002 | Olson et al. | |
| 6,510,473 B1 | 1/2003 | Voit | |
| 6,556,672 B1 | 4/2003 | Holland et al. | |
| 6,642,942 B1 | 11/2003 | Crook | |
| 6,741,791 B1 | 5/2004 | Wymore et al. | |
| 6,792,102 B2 | 9/2004 | Shires | |
| 6,820,209 B1 * | 11/2004 | Culbert et al. | 713/501 |
| 6,853,720 B2 | 2/2005 | Ramachandran | |
| 6,920,216 B2 | 7/2005 | Finnie et al. | |
| 2002/0083241 A1 | 6/2002 | Moller | |

(Continued)

OTHER PUBLICATIONS

"A bus on a diet-the serial bus alternative-an introduction to the P1394 High Performance Serial Bus" by M. Teener (abstract only) Publication Date: Feb. 24-28, 1992.

(Continued)

Primary Examiner—Thuan Du
(74) Attorney, Agent, or Firm—Blakely, Sokoloff, Taylor & Zafman LLP

(57)    ABSTRACT

A variable speed bus has its frequency adjusted based upon bandwidth requirements of active units coupled to a variable speed bus. As units coupled to the bus are stopped, bandwidth requirements are lowered and the bus frequency is reduced in response to the lowered bandwidth requirements. An arbiter selects an appropriate arbitration configuration based on which units are active and which are stopped. The arbitration configuration is adjusted to ensure that the bandwidth requirements of the active units are sustained despite the reduced clock frequency.

20 Claims, 2 Drawing Sheets

U.S. PATENT DOCUMENTS

2004/0017234 A1    1/2004    Tam et al.
2005/0044442 A1    2/2005    Barr et al.

OTHER PUBLICATIONS

PCT Search Report and Written Opinion, PCT/US2005/008998, Int'l. Filing Date Mar. 18, 2005, mailed Jan. 25, 2006. (11 pages).

"PWM inverters and their influence on motor overvoltage" by Kerkman et al. (abstract only) Publication Date: Feb. 23-27, 1997.

"Office action mailed by Examiner Ray, Gopal C. on Aug. 28, 2006 regarding U.S. Appl. No. 10/810,026, filing date Mar. 26, 2004.".

\* cited by examiner

POWER MANAGED BUSSES AND ARBITRATION

FIELD OF THE INVENTION

The present invention pertains to the field of computer systems. More particularly, this invention pertains to the field of power management of devices within computer systems.

BACKGROUND OF THE INVENTION

In many semiconductor devices such as embedded processors, systems-on-a-chip (SOC), or other computer systems or consumer electronic devices, on-chip busses are becoming faster and wider with many associated register queues and related logic in attached unit interfaces. Split transaction capabilities on these busses have added significant depth to these queues. This is leading to a situation where on-chip busses and their associated interfaces will become a significant portion of overall system power, particularly in SOC designs.

In prior systems, power management may include simply reducing clock frequency for portions of the system (e.g., host processor), stopping clocks to unused logic units, or reducing clock frequency for the entire system, including busses. Another technique that is used is to throttle the clock off and on rather than slowing the clock down. These prior systems do not provide throttling of shared system resources such as backbone busses based on bandwidth demands and do not provide adjustments to arbitration configuration to provide sustained and stable bandwidth allocations despite aggregate bandwidth reductions.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, one embodiment of the invention involves throttling a bus frequency based upon bandwidth requirements of active units coupled to a variable speed bus. As units coupled to the bus are stopped, bandwidth requirements are lowered and the bus frequency is reduced in response to the lowered bandwidth requirements in order to reduce power consumption. Further, an arbiter selects an appropriate arbitration configuration based on which units are active and which are stopped. The arbitration configuration is adjusted to ensure that the bandwidth requirements of the active units are sustained despite reduced clock frequency.

The embodiments described herein discuss power management of shared resources such as busses by modulating bus frequency and adjusting arbiter configuration depending on current shared resource utilization. A wide range of techniques may be used to power manage the individual units or devices coupled to the bus.

Figure 1:
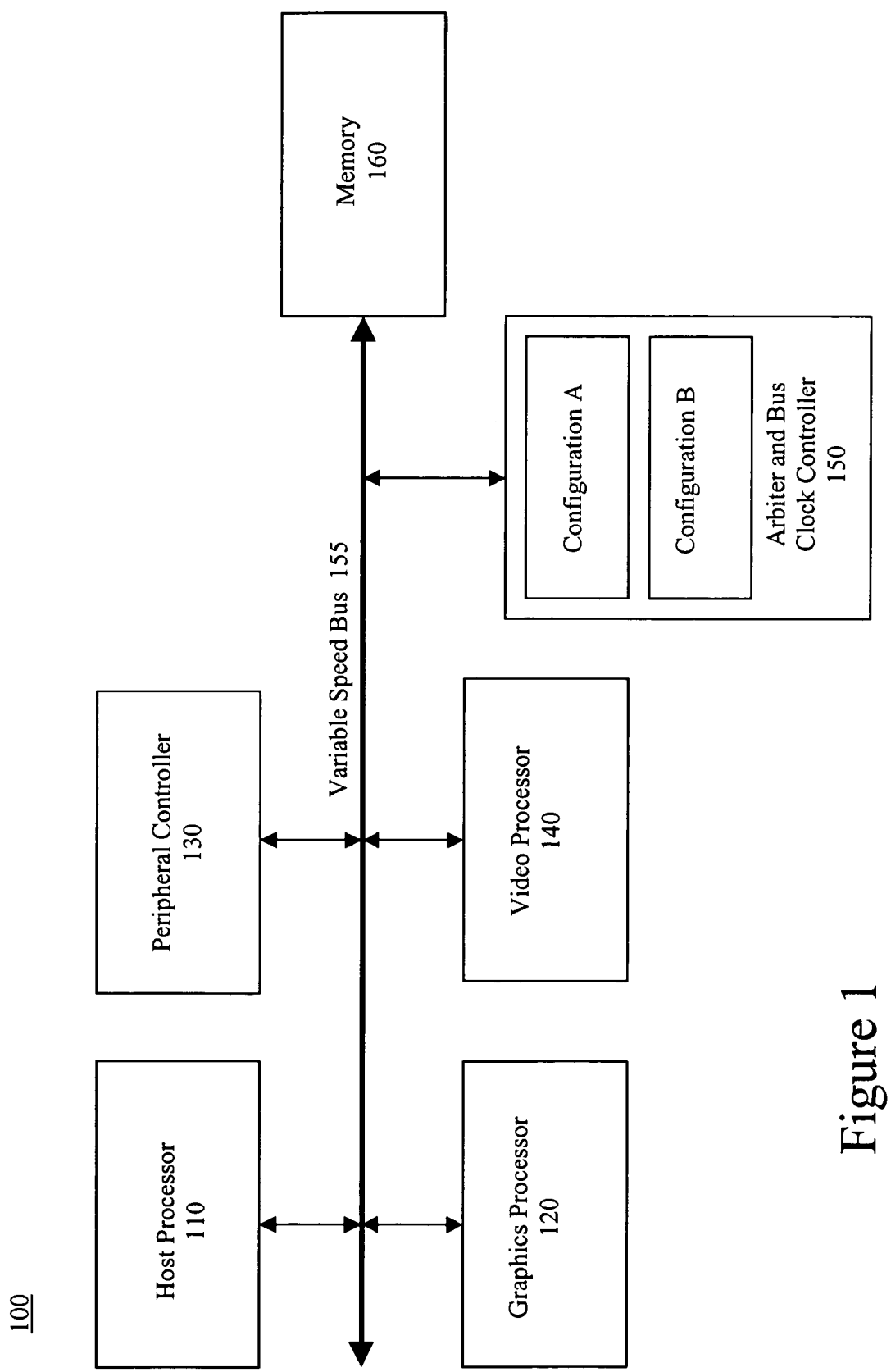
FIG. 1 is a block diagram of one embodiment of a system including several functional units and an arbitration and bus clock control unit coupled to a variable speed bus.

FIG. 1 is a block diagram of an example system 100 including a host processor unit 110, a graphics processor unit 120, a peripheral device controller 130, a video processor unit 140, an arbiter and bus clock controller 150, and a memory 160 coupled to a variable speed bus 155. The frequency of the variable speed bus 155 is controlled by the arbitration and bus clock controller 150. The system 100 is merely one of a large range of possible system configurations. The system 100 may be implemented on a single integrated circuit die, or may be implemented as discrete devices coupled to a bus.

For this example embodiment, the host processor 110 may require 700 MB/s bandwidth when active. The graphics processor 120 may require 300 MB/s of bandwidth when active. The peripheral device controller 130 may require 100 MB/s of bandwidth when active. The video processor may require 900 MB/s of bandwidth when active. The variable speed bus 155 may be a 64 bit wide bus having a top frequency of 250 MHz, yielding a maximum of 2 GB/s of available bandwidth. If all of the units 110, 120, 130, and 140 are active, the arbiter selects a configuration A which allocates 7 of 20 arbitration slots to the host processor 110, 3 of 20 arbitration slots to the graphics processor 120, 1 of 20 arbitration slots to the peripheral device controller 130, and 9 of 20 arbitration slots to the video processor 140.

For the current example, if the host processor 110 and graphics processor 120 are not used or are in a very low use state, such as when performing continuous video playback (watching a movie) using the peripheral controller 130 and the video processor 140, the variable speed bus may have as much as 1 GB/s of unused bandwidth. In this scenario, the variable speed bus 155 can reduce its frequency by 50%. In order to ensure that the video processor continues to receive its required 900 MB/s of bandwidth, the arbiter 150 selects a configuration B that provides 9 of 10 possible arbitration slots to the video processor 140. The peripheral controller 130 receives the remaining 1 of 10 arbitration slots to ensure that it receives its required 100 MB/s bandwidth.

Continuing with the current example, it is possible that the video processor 140 may switch its bandwidth requirements from 900 MB/s to 100 MB/s. The variable speed bus 155 frequency can now be reduced to 200 MB/s and the arbiter can change to a configuration where the video processor 140 is allocated 1 of 2 possible arbitration slots and the peripheral device controller 130 also receives 1 of 2 arbitration slots in order to ensure that each of the video processor 140 and the peripheral device controller 130 receive their required 100 MB/s of bandwidth.

Another example of a situation that can benefit from being able to adjust both bus frequency and arbitration configuration is the situation where the host processor 110 is working mainly out of its cache. To load the cache, the variable speed bus 155 can increase its clock frequency in order to support the 700 MB/s required by the host processor. Once the cache has been loaded and the processor is working mainly out of its cache, the bus frequency can be reduced and the arbiter can adjust its configuration to take into account the processor's lack of activity on the bus 155.

Figure 2:
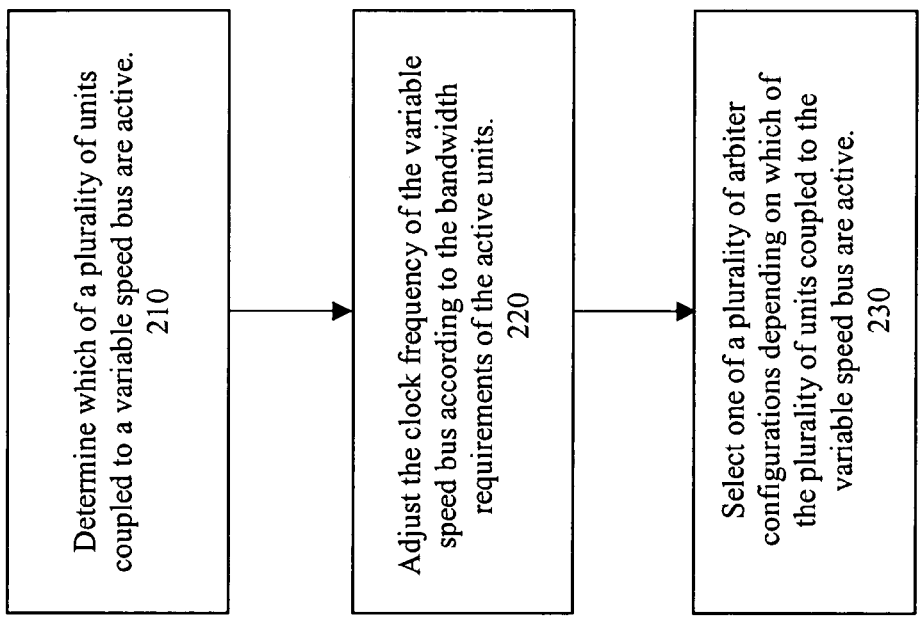
FIG. 2 is a flow diagram of one embodiment of a method for power managing a variable speed bus and adjusting arbitration configuration.

FIG. 2 is a flow diagram of one embodiment of a method for power managing a variable speed bus and adjusting arbitration configuration. At block 210, a determination is made as to which of a plurality of units coupled to a variable speed bus are active. The clock frequency of the variable speed bus is adjusted according to the bandwidth requirements of the active units at block 220. At block 230, one of a plurality of arbiter configurations is selected depending on which of the plurality of units coupled to the variable speed bus are active.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
   a variable speed bus;
   a first unit coupled to the variable speed bus;
   a second unit coupled to the variable speed bus; and
   an arbitration and bus clock control unit to adjust the variable speed bus frequency depending on the bandwidth requirements of the first and second units, the arbitration and bus clock control unit to monitor which of the first and second units are active and to select an appropriate arbitration configuration depending on which of the first and second units are active, wherein the arbitration and bus clock control unit is configured to adjust the arbitration configuration to ensure that the bandwidth requirements of the active units are sustained when the variable speed bus frequency is reduced.

2. The apparatus of claim 1, wherein the first unit is a host processor unit.

3. The apparatus of claim 1, wherein the second unit is a video processor unit.

4. The apparatus of claim 1, wherein the first unit is a graphics processor unit.

5. The apparatus of claim 1, wherein the second unit is a peripheral device controller unit.

6. The apparatus of claim 1, wherein the variable speed bus, the first unit, the second unit, and the arbitration and clock control unit are located on a single semiconductor die.

7. The apparatus of claim 1, wherein the arbitration and bus clock control unit is configured to adjust the arbitration configuration depending on current shared resource utilization by the active units.

8. The apparatus of claim 1, wherein the arbitration and bus clock control unit is configured to adjust the arbitration configuration depending on current shared resource utilization by the active units.

9. A system, comprising:
   a variable speed bus;
   a first device coupled to the variable speed bus;
   a memory coupled to the variable speed bus;
   a second device coupled to the variable speed bus; and
   an arbitration and bus clock control unit to adjust the variable speed bus frequency depending on the bandwidth requirements of the first and second devices, the arbitration and bus clock control unit to monitor which of the first and second devices are active and to select an appropriate arbitration configuration depending on which of the first and second devices are active, wherein the arbitration and bus clock control unit is configured to adjust the arbitration configuration to ensure that the bandwidth requirements of the active units are sustained when the variable speed bus frequency is reduced.

10. The system of claim 9, wherein the first device coupled to the variable speed bus is a processor.

11. The system of claim 8, wherein the second device coupled to the variable speed bus is a video processor.

12. The system of claim 11, further comprising a third device coupled to the variable speed bus, the arbitration and bus clock control unit to monitor whether the third device is active and to select an appropriate arbitration configuration depending on which of the first, second, and third devices are active.

13. The system of claim 12, wherein the third device coupled to the variable speed bus is a peripheral device controller.

14. The system of claim 13, the variable speed bus being 64 bits in width.

15. A method, comprising:
   determining which of a plurality of units coupled to a variable speed bus are active;
   adjusting the clock frequency of the variable speed bus according to the bandwidth requirements of the active units; and
   selecting one of a plurality of arbiter configurations depending on which of the plurality of units coupled to the variable speed bus are active, wherein selecting the one arbiter configuration comprises selecting the one of the plurality of arbiter configurations that ensures the bandwidth requirements of the active units are sustained when the clock frequency of the variable speed bus is reduced.

16. The method of claim 15, wherein determining which of a plurality of units coupled to a variable speed bus are active includes determining which of a host processor, a graphics processor, a peripheral device controller, and a video processor are active.

17. The method of claim 16, wherein adjusting the clock frequency of the variable speed bus includes setting the clock frequency to a first frequency if the host processor and the graphics controller are determined to be inactive.

18. The method of claim 17, wherein selecting one of a plurality of arbiter configurations includes selecting a first configuration if the host processor and the graphics processor are determined to be inactive.

19. The method of claim 16, wherein adjusting the clock frequency of the variable speed bus includes setting the clock frequency to a second frequency if the host processor and the graphics controller are determined to be active.

20. The method of claim 19, wherein selecting one of a plurality of arbiter configurations includes selecting a second configuration if the host processor and the graphics processor are determined to be active.

* * * * *